United States Patent
Jin

(10) Patent No.: US 12,495,869 B1
(45) Date of Patent: Dec. 16, 2025

(54) ANTI-JAMMING RATCHET-TYPE TENSIONING DEVICE

(71) Applicant: Ningbo Xuding Rigging Co., Ltd, Zhejiang (CN)

(72) Inventor: Zhengbao Jin, Zhejiang (CN)

(73) Assignee: Ningbo Xuding Rigging Co., Ltd, Zhejiang (CN)

( * ) Notice: Subject to any disclaimer, the term of this patent is extended or adjusted under 35 U.S.C. 154(b) by 0 days.

(21) Appl. No.: 19/270,647

(22) Filed: Jul. 16, 2025

Related U.S. Application Data

(63) Continuation-in-part of application No. 18/971,193, filed on Dec. 6, 2024.

(51) Int. Cl.
| | |
|---|---|
| A44B 11/16 | (2006.01) |
| A44B 11/06 | (2006.01) |
| B60P 7/08 | (2006.01) |
| F16G 11/12 | (2006.01) |

(52) U.S. Cl.
CPC ............ *A44B 11/065* (2013.01); *B60P 7/083* (2013.01); *F16G 11/12* (2013.01); *Y10T 24/2175* (2015.01)

(58) Field of Classification Search
CPC .......... A44B 11/065; B66D 3/02; B66D 1/04; B60P 7/083; B60P 7/0846; B25B 25/00; Y10T 24/2175; F16G 11/12
See application file for complete search history.

(56) References Cited

U.S. PATENT DOCUMENTS

| | | | | |
|---|---|---|---|---|
| 7,503,736 | B1 * | 3/2009 | Chen | B60P 7/083 410/100 |
| 8,286,945 | B2 * | 10/2012 | Polin, Jr. | B65D 63/16 254/223 |
| 8,312,601 | B2 * | 11/2012 | Huang | B60P 7/083 254/218 |
| 2009/0283729 | A1 * | 11/2009 | Carlson | B60P 7/083 254/218 |
| 2013/0036580 | A1 * | 2/2013 | Huang | B60P 7/083 24/68 CD |
| 2014/0008480 | A1 * | 1/2014 | Kingery | B60P 7/083 242/389 |
| 2016/0347233 | A1 * | 12/2016 | Kingery | B60P 7/0846 |
| 2021/0170937 | A1 * | 6/2021 | Chen | B60P 7/083 |
| 2023/0346082 | A1 * | 11/2023 | Seader | B60P 7/083 |
| 2024/0409022 | A1 * | 12/2024 | Chen | B60P 7/083 |

* cited by examiner

*Primary Examiner* — Jason W San
*Assistant Examiner* — Rowland Do
(74) *Attorney, Agent, or Firm* — Hawaii Patent Services; Nathaniel K. Fedde; Kenton N. Fedde

(57) ABSTRACT

The present disclosure relates to an anti-jamming ratchet-type tensioning device, comprising a base, a winding and unwinding mechanism with a ratchet wheel, and an operating mechanism. The operating mechanism controls locking or unlocking via a lever element, with an elastic check claw provided at the executing end of the lever element to prevent reverse rotation of the ratchet wheel. The key feature lies in the design of the lever element's pivot point as a movable structure. When the ratchet wheel rotates clockwise and pushes the check claw, the lever element can move upward with the thrust to avoid obstruction, reducing frictional resistance, effectively preventing jamming, and ensuring smooth and effortless webbing extraction.

15 Claims, 15 Drawing Sheets

ANTI-JAMMING RATCHET-TYPE TENSIONING DEVICE

CROSS-REFERENCE TO RELATED APPLICATIONS

This application is a continuation-in-part of U.S. patent application Ser. No. 18/971,193 filed on Dec. 6, 2024, all the contents and the amendments of which are incorporated into this application by reference.

TECHNICAL FIELD

The present disclosure relates to that technical field of tensioners, in particular to an anti-jamming ratchet-type tensioning device.

BACKGROUND

Tensioner, as a tool that plays a securing function in the transportation, movement, shipment or storage of goods, mainly strengthens steel formwork, compresses wooden boards or fixes other goods by tensioning. Tensioner, as an important mechanical accessory, is mainly used to adjust and fix binding devices such as ropes, rope nets or straps. In the fields of cargo transportation and storage, tensioners can ensure the stability and safety of goods during transportation and prevent goods from being damaged due to shaking or collision.

The existing German patent No. DE102007020856A1 also discloses a tensioner. The check pawl and the locking pawl in this patent are usually separately disposed, and the check pawl and the locking pawl need to interact with each other to realize the separation of the check pawl from the check state, leading to the result that the operation of the tensioner is unchanged, the tensioning structure is more complicated, and the manufacturing cost is high.

Therefore, there is a need to put forward a new tensioner, which has a simple and compact structure, convenient operation and low manufacturing cost.

SUMMARY

The present disclosure provides an anti-jamming ratchet-type tensioning device to solve the problems mentioned in the background art.

In order to achieve the above purpose, the present disclosure provides an anti-jamming ratchet-type tensioning device, comprising: a base; and a winding and unwinding mechanism disposed on the base, wherein the winding and unwinding mechanism comprises: a ratchet wheel equipped with gear teeth; and an operating mechanism disposed on the base, with a moving area formed on the operating mechanism; and a lever element pivotally connected to the operating mechanism, wherein the lever element comprises: a pressing end; and an executing end; and an elastic check claw disposed on the executing end, wherein the elastic check claw is located within a rotation radius of the ratchet wheel and configured to prevent reverse rotation of the ratchet wheel; and a support member passing through the moving area, wherein a gap exists between an inner wall of the moving area and the support member, allowing limited movement of the support member within the moving area, and meanwhile the pressing end and the executing end pivot on the support member to form a lever, such that pressing the pressing end causes the executing end to lift, and the elastic check claw is positioned outside the rotation radius of the ratchet wheel; and wherein when the ratchet wheel rotates clockwise and impacts the elastic check claw, an impact force is transmitted through the elastic check claw and the lever element to the support member, driving the support member to move within a moving area and causing the elastic check claw to produce an instantaneous avoidance displacement relative to the ratchet wheel, such that the gear teeth maintain a non-rigid contact as sliding past the elastic check claw, thereby reducing frictional resistance and avoiding jamming.

The beneficial effects of the present invention compared to the prior art are as follows:

By providing an oval-shaped through-hole on the support member of the lever element, the pin shaft in the lever element can undergo limited displacement within the hole. When the ratchet wheel rotates clockwise and impacts the elastic check claw, the impact force is transmitted through the elastic check claw to the pin shaft. At this time, the radial clearance provided by the through-hole allows the pin shaft to slide along the long axis of the hole, such as toward the side away from the ratchet wheel, driving the elastic check claw to move synchronously, achieving instantaneous avoidance of the ratchet wheel. This design converts impact forces into controllable sliding displacement, completely eliminating the jamming phenomenon of traditional rigid check structures, significantly improving operational smoothness while reducing rotational resistance, achieving an effort-saving effect.

Figure 1:
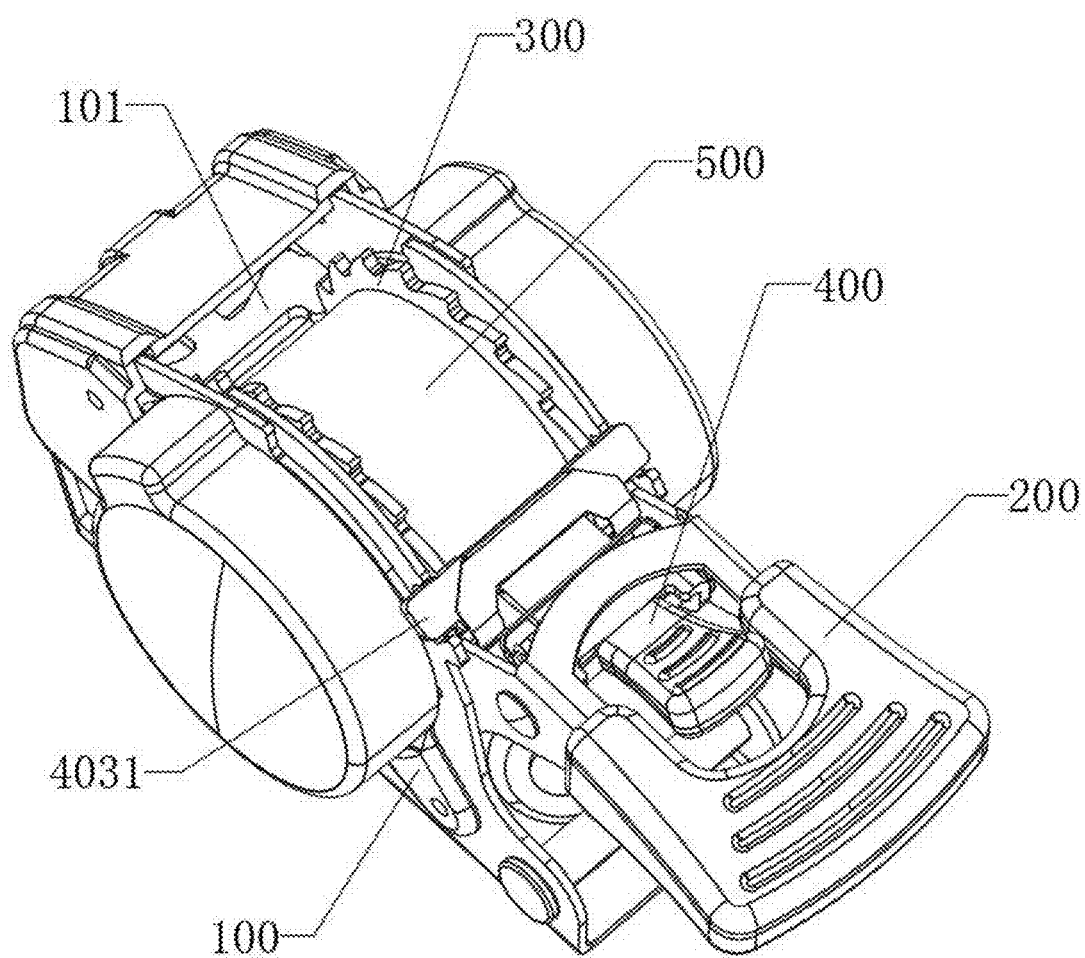
FIG. 1 is a structural schematic view of the present disclosure.

Reference signs: Base (100); Accommodating area (101); Side wall (102); Locked position (1021); Released position (1022); Separator (1023); Operating mechanism (200); Connecting part (201); Extended end (2011); Through-hole (2012); Handle (202); Winding and unwinding mechanism (300); Central shaft (301); Drum (302); Ratchet wheel (303); Gear teeth (3031); Shaft sleeve (304); Lever element (400); Pressing end (401); Executing end (402); Locking element (403); Positioning part (4031); Elastic check claw (404); Arc-shaped part (4041); Folded-back part (4042); Torsion spring (405); Pin shaft (406); Rotating part (407); Slotted hole (408); Topmost end (4081); Bottommost end (4082); Webbing (500).

DESCRIPTION OF EMBODIMENTS

Figure 2:
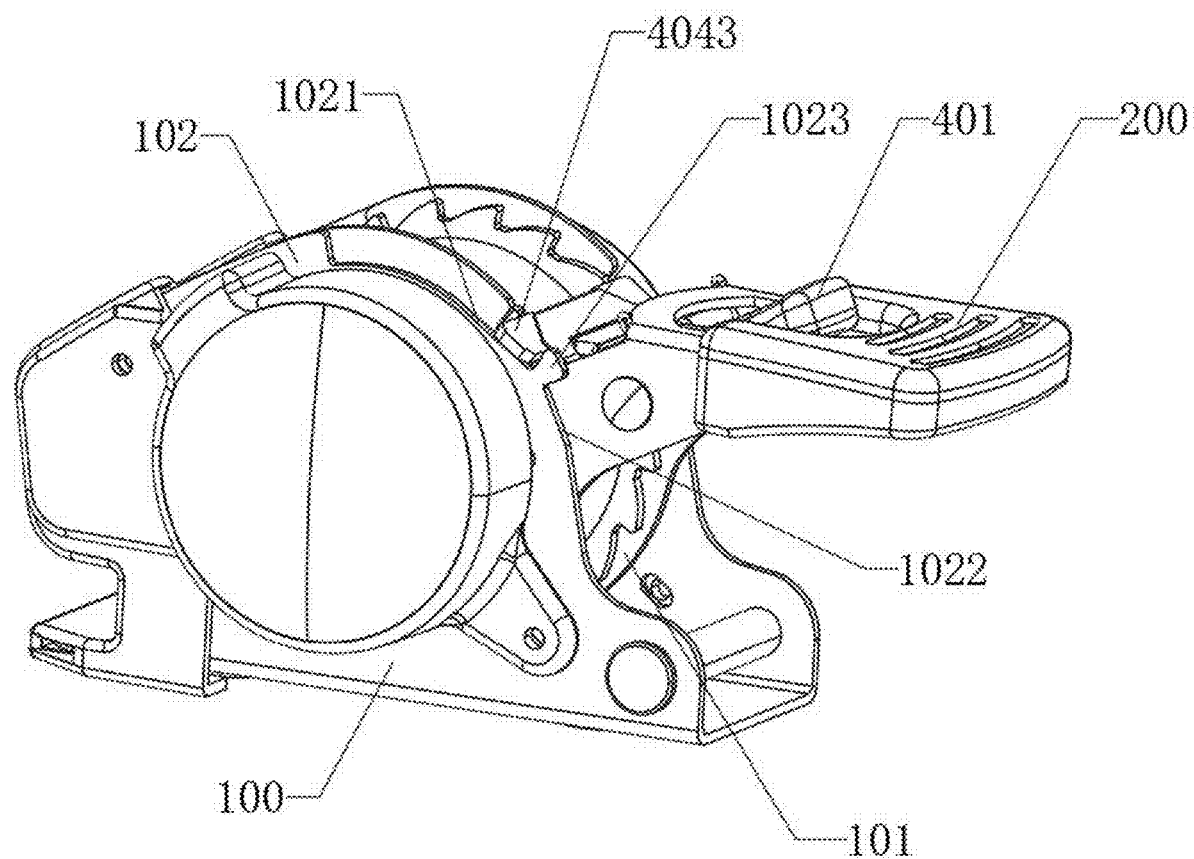
FIG. 2 is a structural schematic view from another perspective of FIG. 1.
Figure 3:
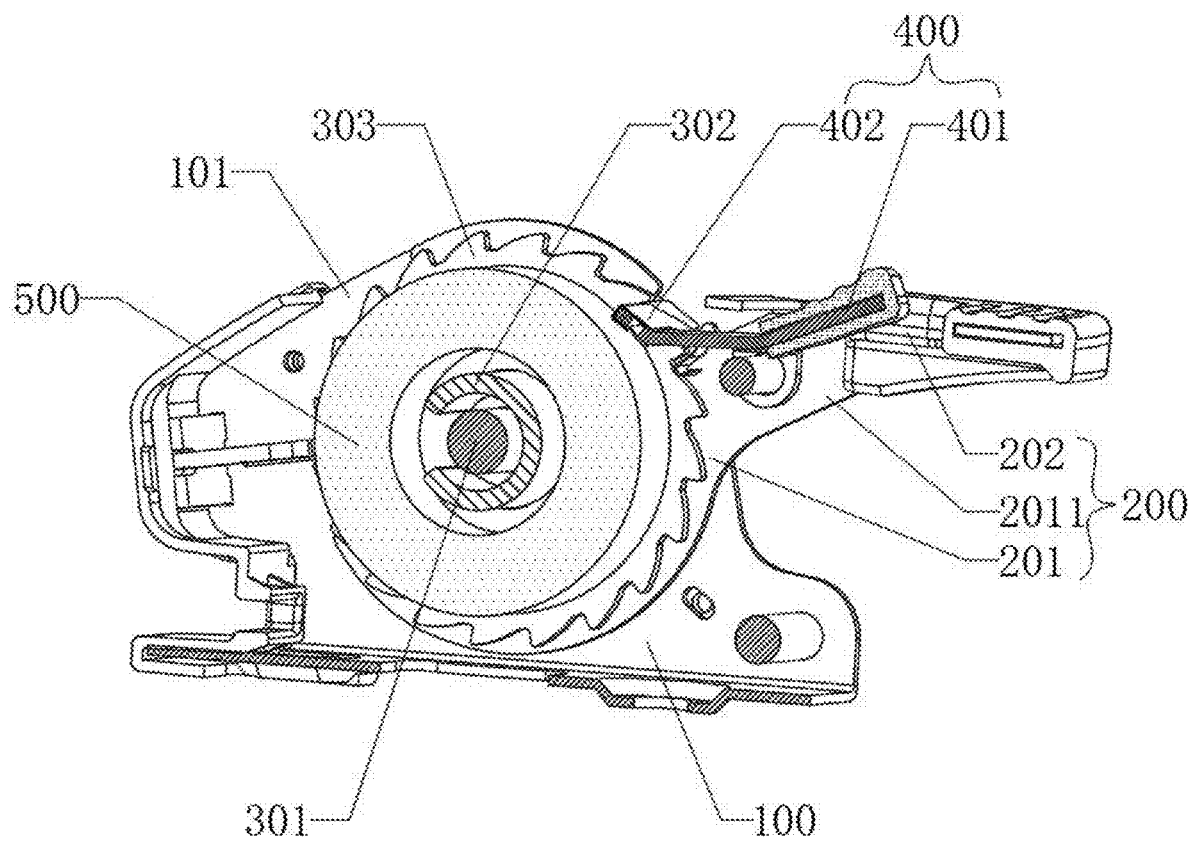
FIG. 3 is a schematic cross-sectional view of FIG. 2 in the transverse direction.

As shown in FIG. 1 to FIG. 3, the present disclosure provides a foldable anti-jamming ratchet-type tensioning device, which includes a base 100 which is provided with an accommodating area 101 for accommodating a webbing 500, and the accommodating area 101 is provided with a winding and unwinding mechanism 300, which includes a ratchet wheel 303 with gear teeth 3031. The accommodating area 101 is further provided with an operating mechanism 200. The winding and unwinding mechanism 300 can be selectively locked or unlocked by the operating mechanism 200. The operating mechanism 200 is rotatably connected with a lever element 400, which has opposite ends that are respectively configured as a pressing end 401 and an executing end 402. The pressing end 401 and the executing end 402 form a labor-saving lever with the rotation position of the lever element 400 as a fulcrum, that is, the distance from the pressing end 401 to the fulcrum is greater than the distance from the executing end 402 to the fulcrum, so as to be easily pressed by a user in use.

Furthermore, the executing end 402 is provided with an elastic check claw 404 located within the rotation radius of the ratchet wheel 303 to prevent the ratchet wheel 303 from rotating back. When the pressing end 401 is pressed, the executing end 402 tilts up, and the elastic check claw 404 tilts up with the executing end 402. At this time, both the executing end 402 and the elastic check claw 404 are located outside the rotation radius of the ratchet wheel 303.

Figure 4:
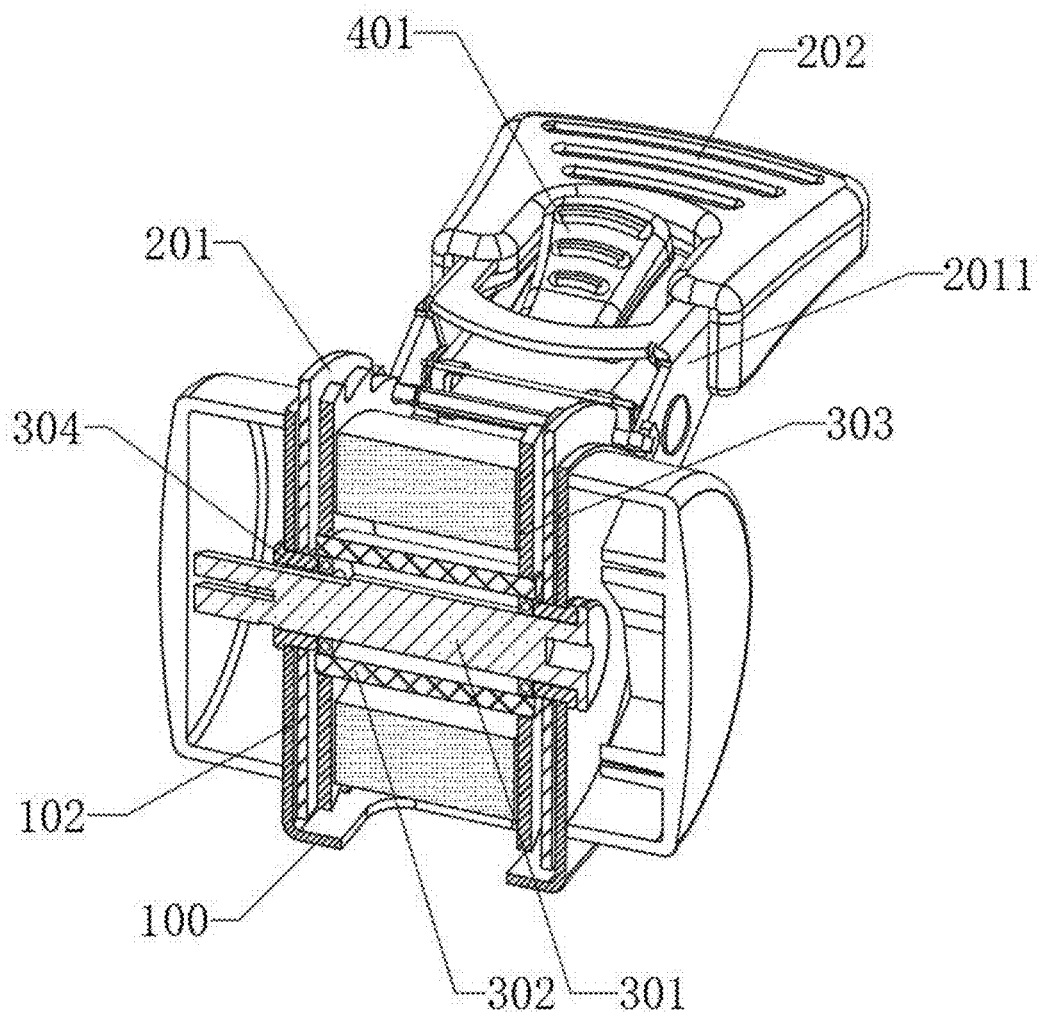
FIG. 4 is a structural schematic view of FIG. 2 in the longitudinal direction.

As shown in FIGS. 3 and 4, the winding and unwinding mechanism 300 further includes a central shaft 301 and a drum 302 for winding the webbing 500. It is worth mentioning that the winding and unwinding mechanism 300 is provided with a volute spiral spring (not shown) for automatic winding and unwinding of the winding and unwinding mechanism 300, which is a well-known technology in the field and will not be described in detail in this application. Further, the accommodating area 101 has enough space, and the central shaft 301 is installed at a suitable position to ensure the winding and unwinding of the webbing 500.

The central shaft 301 is inserted into the accommodating area 101, the drum 302 is sleeved outside the central shaft 301 and rotatably connected with the central shaft 301. The ratchet wheel 303 is sleeved outside the drum 302 and fixedly connected with the drum 302 to ensure that the ratchet wheel 303 and the drum 302 wound with the webbing 500 rotate synchronously. A shaft sleeve 304 is embedded between the central shaft 301 and the base 100, and at least part of the shaft sleeve 304 is located in the accommodating area 101.

The shaft sleeve 304 and the components sleeved on the shaft sleeve 304 are stationary relative to the central shaft 301, and the part of the shaft sleeve 304 located outside the accommodating area 101 has a larger radius, thus limiting the axial relative movement of the components on the shaft sleeve 304.

Further, bearings are disposed between the shaft sleeves 304, and the bearings can be deep groove ball bearings or cylindrical roller bearings, etc. Preferably, deep groove ball bearings are used, wherein the bearings and components sleeved on the bearings can rotate relative to the central shaft 301.

Figure 5:
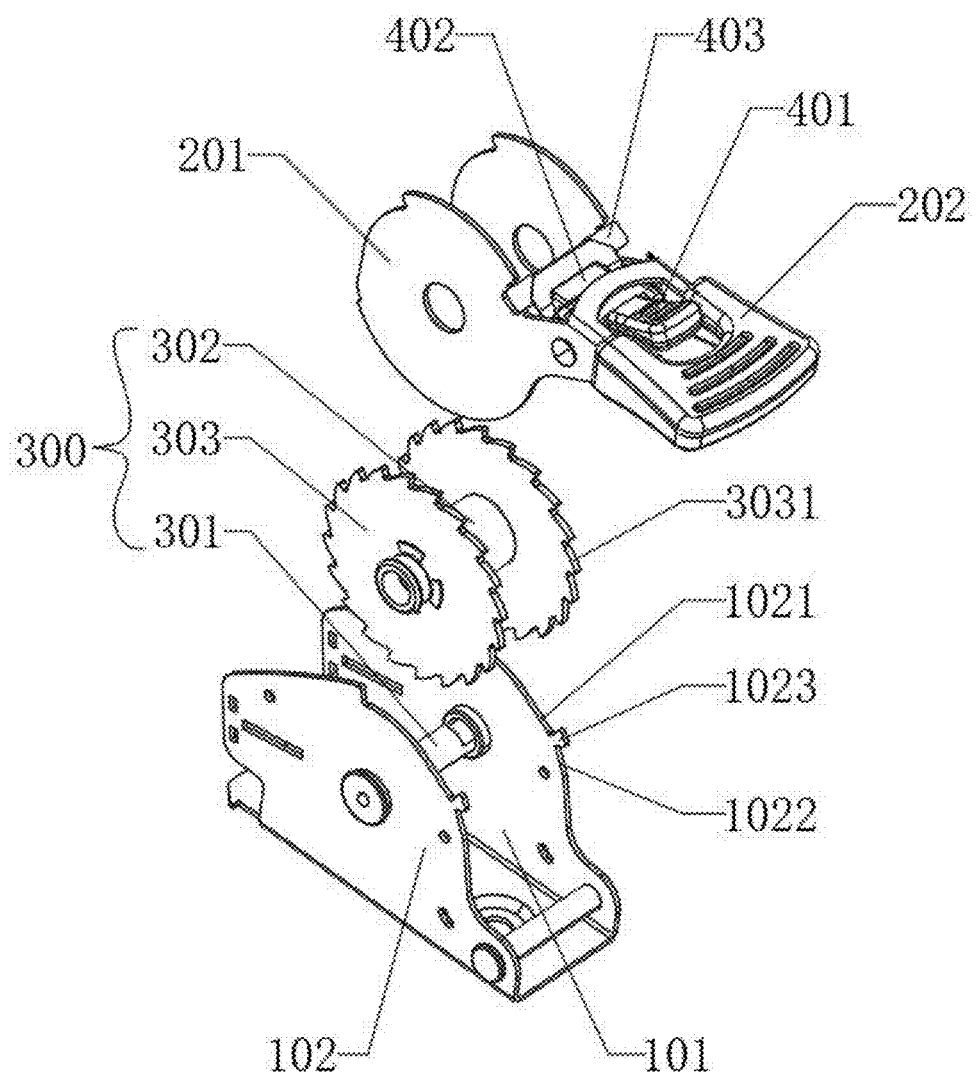
FIG. 5 is an exploded view of the present disclosure.
Figure 6:
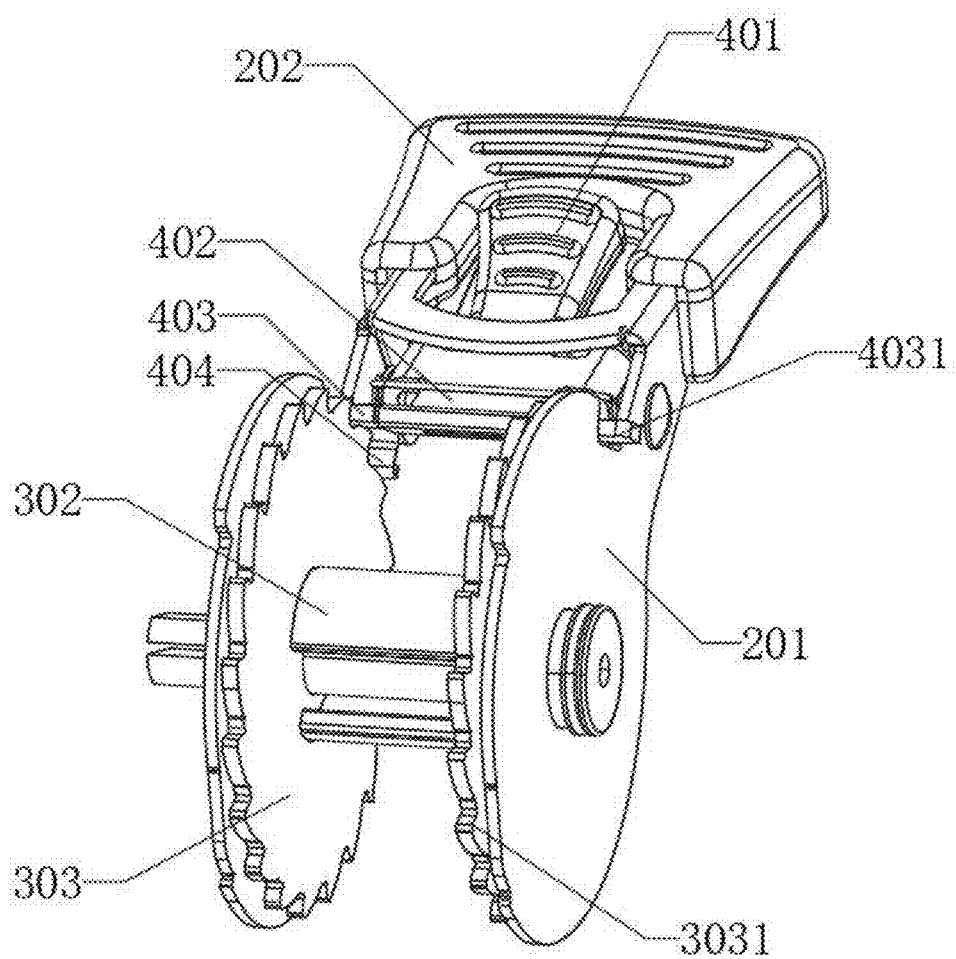
FIG. 6 is a structural schematic view of the operating mechanism of the present disclosure.

As shown in FIGS. 5 and 6, the operating mechanism 200 includes a connecting part 201 and a handle 202. The connecting part 201 is sleeved outside the shaft sleeve 304 and is rotatably connected with the shaft sleeve 304. The connecting part 201 has an extended end 2011 far away from the winding and unwinding mechanism 300, the handle 202 is installed on the extended end 2011, and the lever element 400 is rotatably connected at the extended end 2011. The executing end 402 is disposed towards the winding and unwinding mechanism 300. A pin shaft 406 is disposed in the middle of the extended end 2011, and the lever element 400 is rotatably connected with the extended end 2011 through the pin shaft 406. A torsion spring 405 is installed on the pin shaft 406, and under normal conditions, the torsion spring 405 is in a natural state, thus forcing the handle 202 to be slightly higher than the extended end 2011, which is convenient for the user to press the handle 202. At the same time, the torsion spring 405 also forces the executing end 402 to abut against the outer contour of the side wall 102. When the pressing end 401 is pressed, the torsion spring 405 is in a working state, stores elastic potential energy, generates a restoring torque, and has a tendency to return to the natural state. Once the pressing end 401 is no longer stressed, the torsion spring 405 returns to the natural state.

Further, the executing end 402 is further provided with a locking element 403, and the elastic check claw 404 is fixedly installed on the locking element 403 and extends towards the ratchet wheel 303. On the other hand, the accommodating area 101 has a side wall 102, and the outer contour of the side wall 102 is provided with a locked position 1021 and a released position 1022 which are matched with the locking element 403, and a separator 1023 is disposed between the locked position 1021 and the released position 1022. A separator 1023, which is configured as a convex block, is disposed between the locked position 1021 and the released position 1022 for separating the locked position 1021 from the released position 1022.

The locked position 1021 and the released position 1022 are spaced from the winding and unwinding mechanism 300, and the spacing between the released position 1022 and the winding and unwinding mechanism 300 is greater than that between the locked position 1021 and the winding and unwinding mechanism 300, in other words, the locked position 1021 is close to the winding and unwinding mechanism 300 and located within the rotation radius of the ratchet wheel 303; The released position 1022 is far away from the winding and unwinding mechanism 300 and located outside the rotation radius of the ratchet wheel 303.

Figure 7:
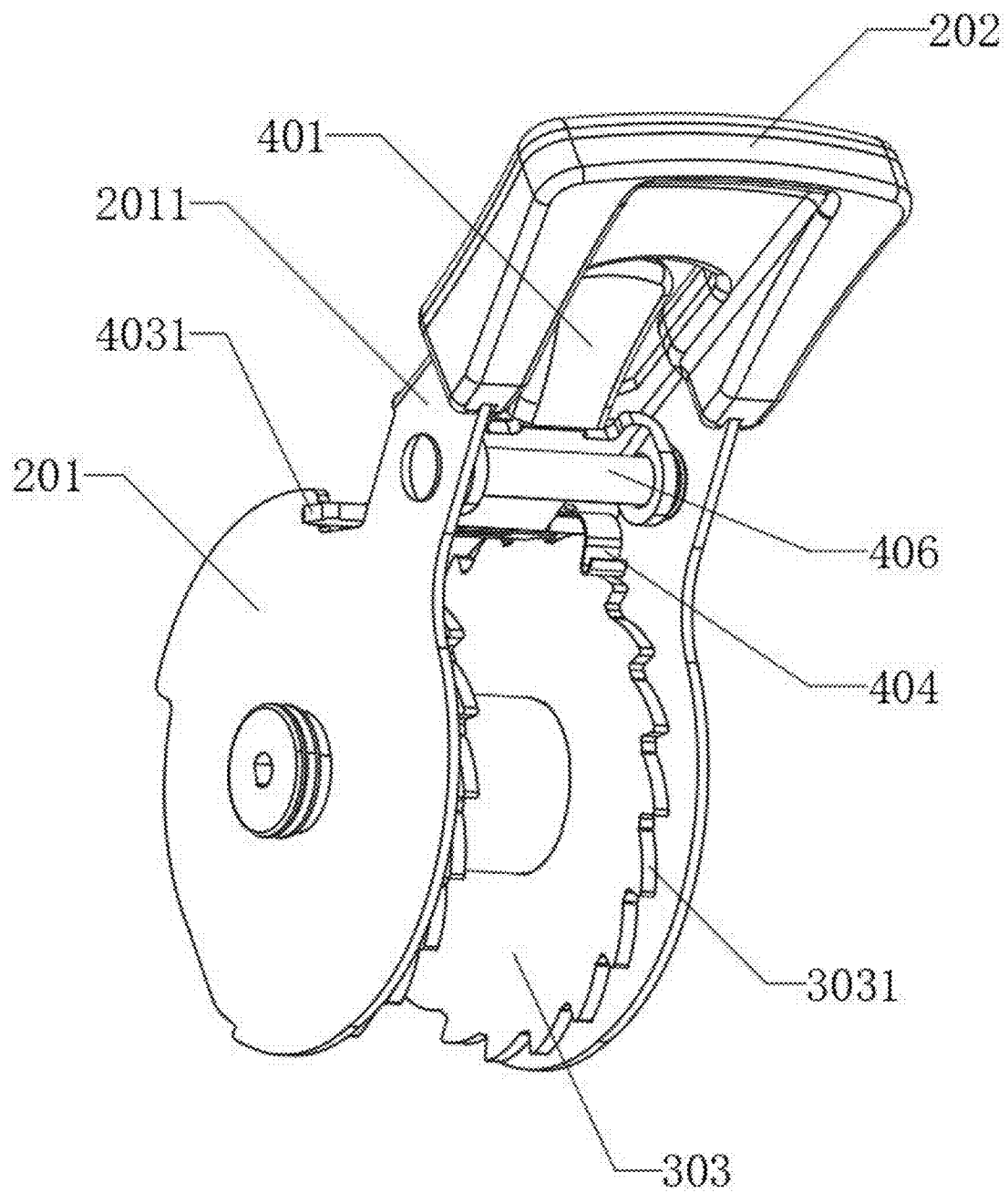
FIG. 7 is a structural schematic view from another perspective of FIG. 6.
Figure 8:
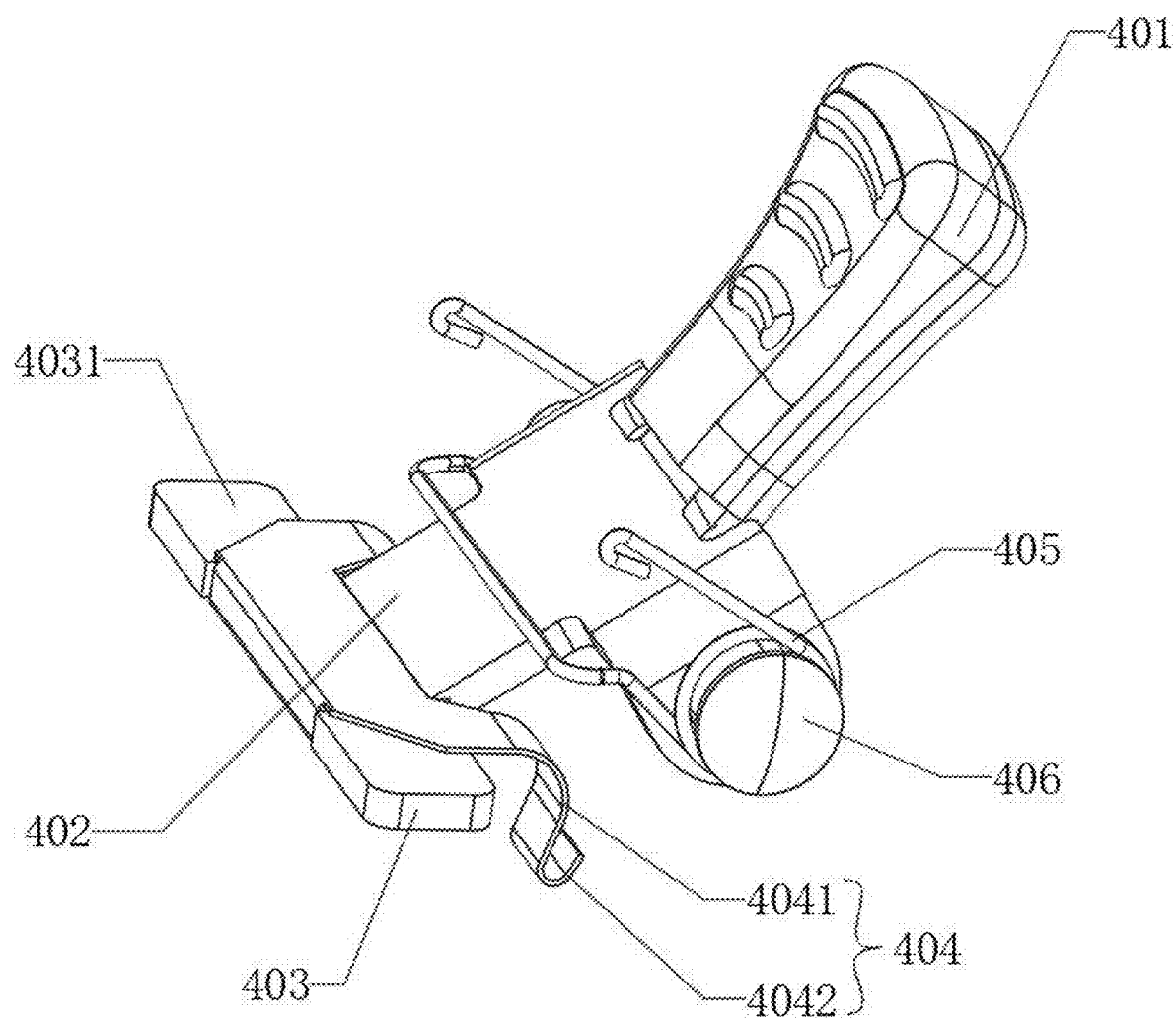
FIG. 8 is a structural schematic view of the lever element.
Figure 9:
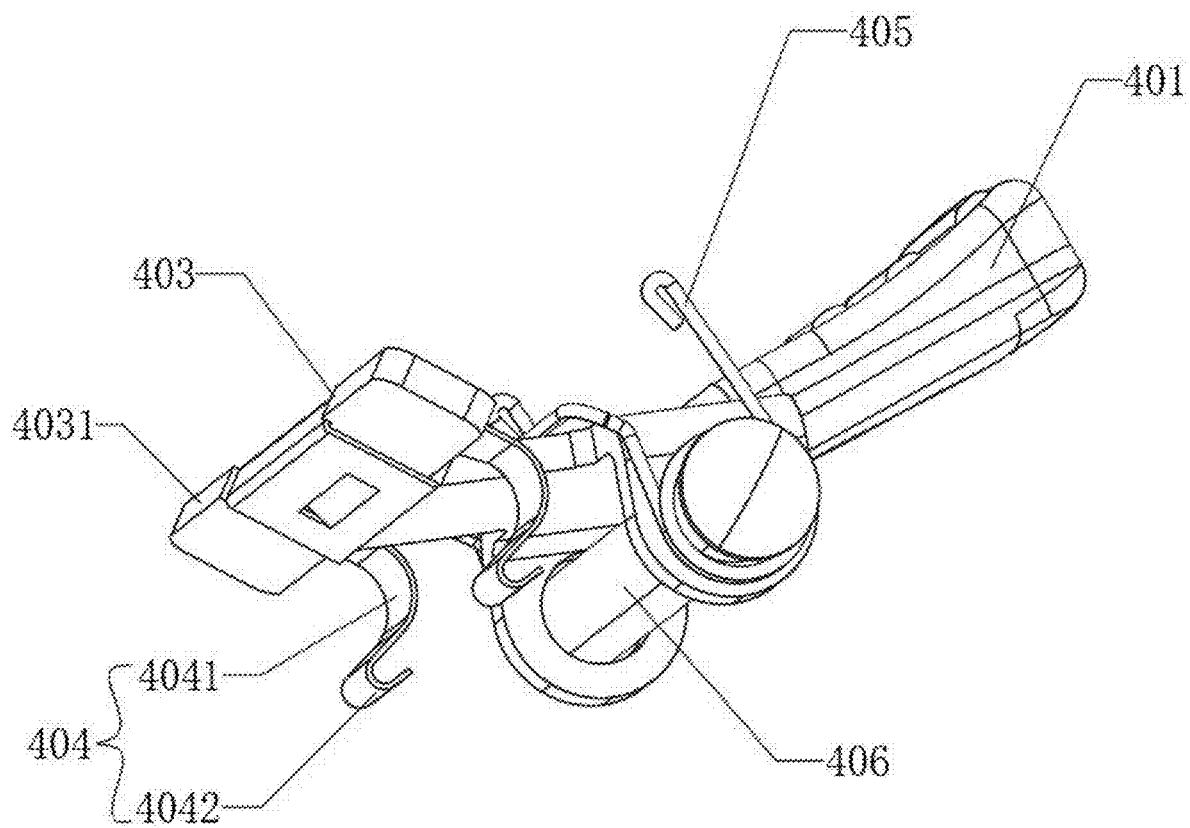
FIG. 9 is a structural schematic view from another perspective of FIG. 8.
Figure 10:
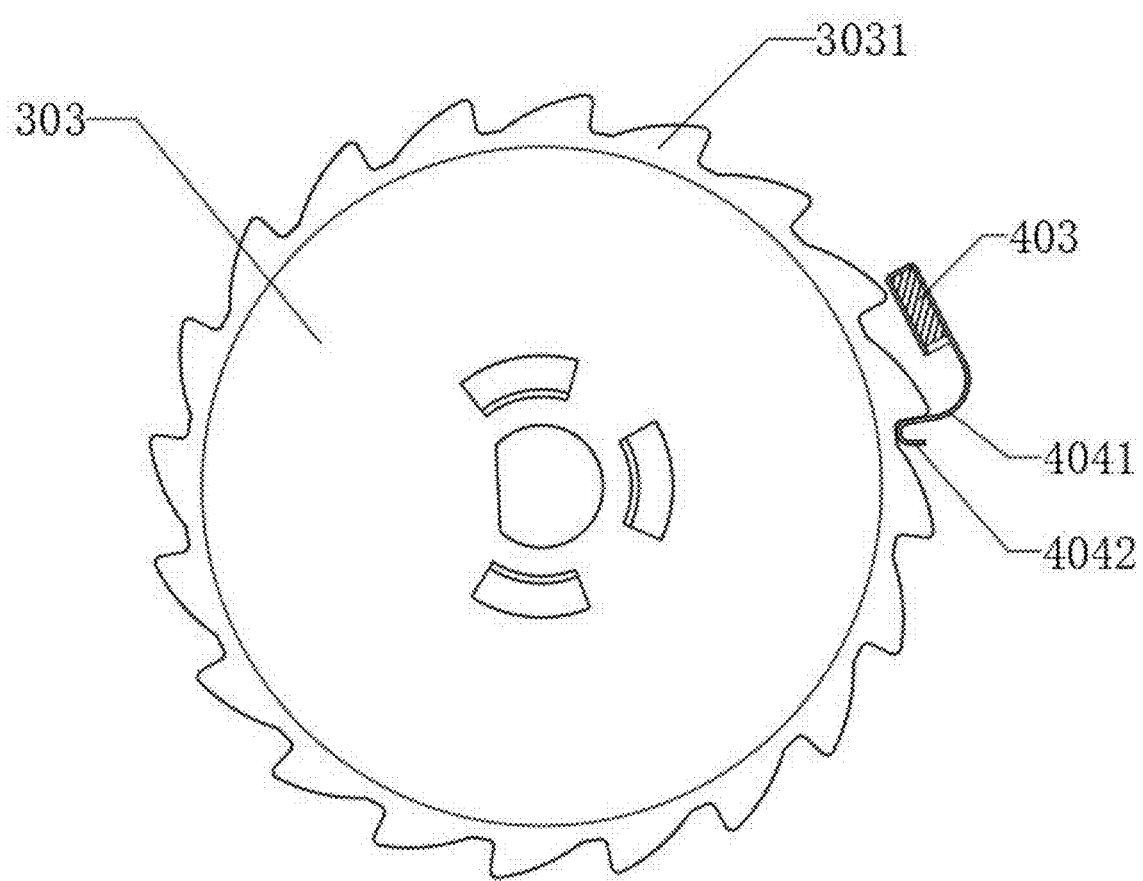
FIG. 10 is a diagram showing the mating state of the ratchet wheel and the elastic check claw of the present disclosure.

As shown in FIGS. 7 and 8, the locking element 403 is provided with a positioning part 4031, which can be selectively placed in the locked position 1021 or the released position 1022, and the locking element 403 and the elastic check claw 404 are relatively fixed. Moreover, the distance between the locking element 403 and the elastic check claw 404 matches the distance between the adjacent gear teeth 3031 on the ratchet wheel 303.

That is, when the positioning part 4031 is placed at the locked position 1021, the elastic check claw 404 abuts against the gear teeth 3031, and when the positioning part 4031 is placed at the released position 1022, the elastic check claw 404 abuts against the adjacent gear teeth 3031. As such, the elastic check claw 404 abuts against the gear teeth 3031 regardless of whether the locking element 403 is placed at the locked position 1021 or the released position 1022.

Further, as shown in FIG. 2, when the positioning part 4031 is located at the locked position 1021, the locking element 403 is located within the rotation radius of the ratchet wheel 303 and is clamped between two adjacent gear teeth 3031. At the same time, the torque of the ratchet wheel 303 is transmitted to the locking element 403 through the gear teeth 3031, and is transmitted to the separator 1023 through the locking element 403, so as to block the gear teeth 3031 and limit the clockwise rotation of the ratchet wheel 303. At the same time, the elastic check claw 404 abuts against the gear teeth 3031, which limits the counterclockwise rotation of the ratchet wheel 303, thus locking the winding and unwinding mechanism 300.

When the pressing end 401 is pressed, the locking element 403 is located outside the rotation radius of the ratchet wheel 303, and at the same time, the operating mechanism 200 is toggled clockwise, so that the locking element 403 rotates to the released position 1022 far away from the winding and unwinding mechanism 300. At this time, the locking element 403 is located outside the rotation radius of the ratchet wheel 303, and the elastic check claw 404 still abuts against the gear teeth 3031, so that the ratchet wheel 303 can rotate clockwise but not counterclockwise. When the pressing end 401 is pressed and the operating mechanism 200 is rotated counterclockwise, both the locking element 403 and the elastic check claw 404 are far away from the ratchet wheel 303, at this time, the ratchet wheel 303 can rotate clockwise and counterclockwise.

Specifically, as shown in FIGS. 7 to 10, the rotation radius of the ratchet wheel 303 is defined as between the top circle radius and the root circle radius of the ratchet wheel 303. The elastic check claw 404 has an arc-shaped part 4041 and a folded-back part 4042, and the arc-shaped part 4041 has a large radius of curvature and thus has a larger elastic deformation. When the ratchet wheel rotates clockwise, the arc-shaped part 4041 changes outward in the radial direction, and the radius of curvature increases, so that the gear teeth 3031 can slide over and push away the elastic check claw 404.

The folded-back part 4042 has a smaller radius of curvature, and thus has a smaller elastic deformation and a greater rigidity. When rotating counterclockwise, the folded-back part 4042 abuts against the gear teeth 3031. The contact surface between the gear tooth 3031 and the folded-back part 4042 gradually moves away from the tooth root to squeeze the folded-back part 4042, which in turn causes the folded-back part 4042 to deform less elastically, and at the same time makes the arc-shaped part 4041 deform radially inward. When squeezed to a certain extent, the folded-back part 4042 and the arc-shaped part 4041 have greater elastic restoring force, so as to resist the gear teeth 3031, prevent the ratchet wheel 303 and the winding and unwinding mechanism 300 from rotating back, and ensure that the winding and unwinding mechanism 300 can only rotate clockwise in the working state.

Further, in the specific use process, the pressing end 401 is pressed and the operating mechanism 200 is rotated counterclockwise with the central shaft 301 as the rotation center, so that the locking element 403 rotates to the leftmost end of the locked position 1021 and abuts against the locked position 1021. At this time, the locking element 403 is clamped at the lowest position of the gear teeth 3031 at the same time, and the elastic check claw 404 tilts up without being subjected to any stress. The pressing end 401 is pressed, and the operating mechanism 200 is rotated clockwise with the central shaft 301 as the rotation center. The elastic check claw 404 can easily jump over the gear teeth 3031 and return to the initial position of the locked position 1021. Due to the action of the coil spring, the webbing 500 tends to retract in this process, but the check device limits the retraction of the webbing 500, and when the operating mechanism 200 is rotated clockwise, the webbing 500 can be tightened.

The pressing end 401 is pressed and the operating mechanism 200 is further rotated counterclockwise, so that the locking element 403 is clamped to the released position 1022. At the same time, the webbing 500 returns to the relaxed state from the tightened state. The pressing end 401 is pressed again, so that the locking element 403 and the elastic check claw 404 tilt up and are located outside the rotation radius of the ratchet wheel 303. Under the action of the coil spring, the webbing 500 is smoothly retracted. Because the present disclosure also has a safety device, the device will not be damaged due to the too fast retraction speed.

The function of the elastic check claw 404 is further explained. When the locking element 403 is in the released position 1022, only the elastic check claw 404 is located in the rotation radius of the ratchet wheel 303. When the webbing 500 is pulled out, the gear teeth 3031 can easily break the block of the arc-shaped part 4041, so that the webbing 500 can be pulled out easily. When it stops pulling the webbing 500, the ratchet wheel 303 will rotate counterclockwise under the action of the coil spring. At this time, the surface of the gear tooth 3031 contacts the folded-back part 4042 and presses the folded-back part 4042. Because the folded-back part 4042 generates elastic deformation and stores elastic potential energy, the restoring moment of the clockwise rotation of the folded-back part 4042 is finally balanced with the restoring moment of the counterclockwise rotation of the coil spring, and the gear teeth 3031 will not rotate back.

Figure 11:
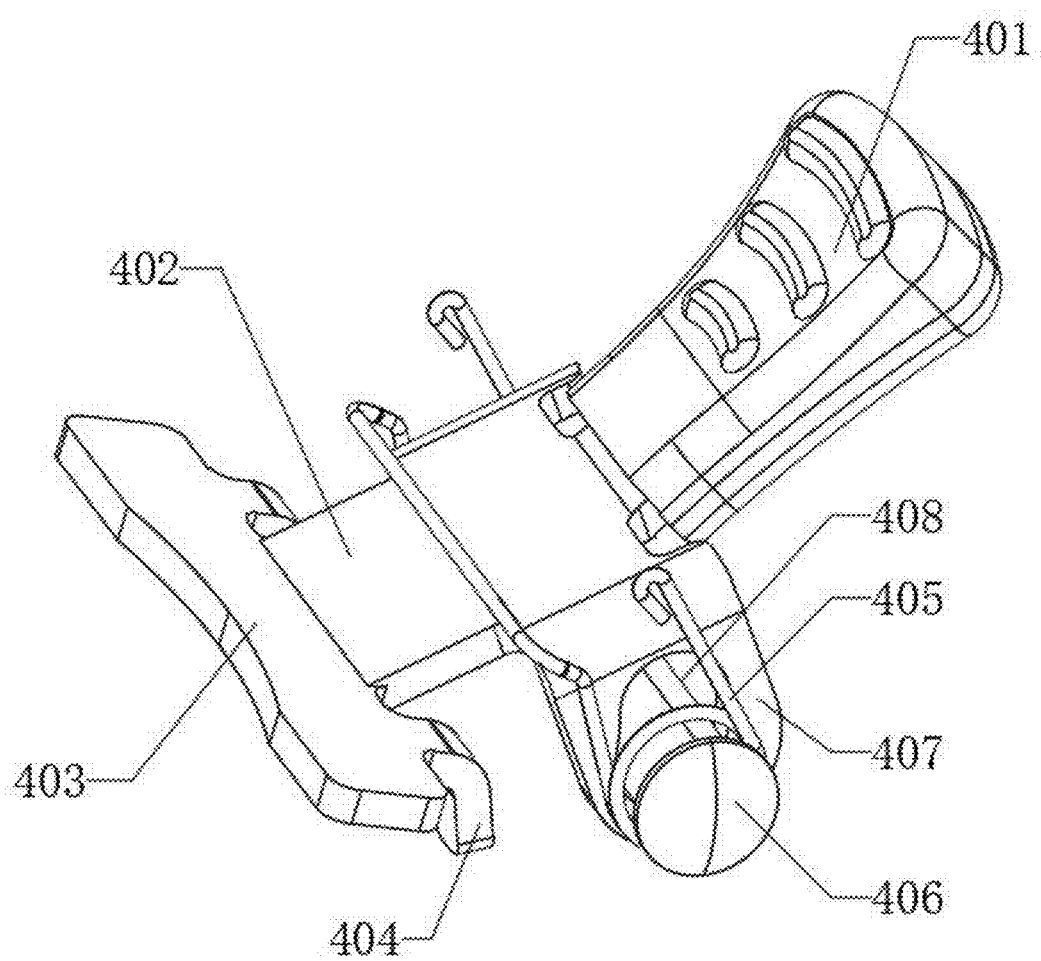
FIG. 11 is a structural schematic view of another embodiment of FIG. 8.
Figure 12:
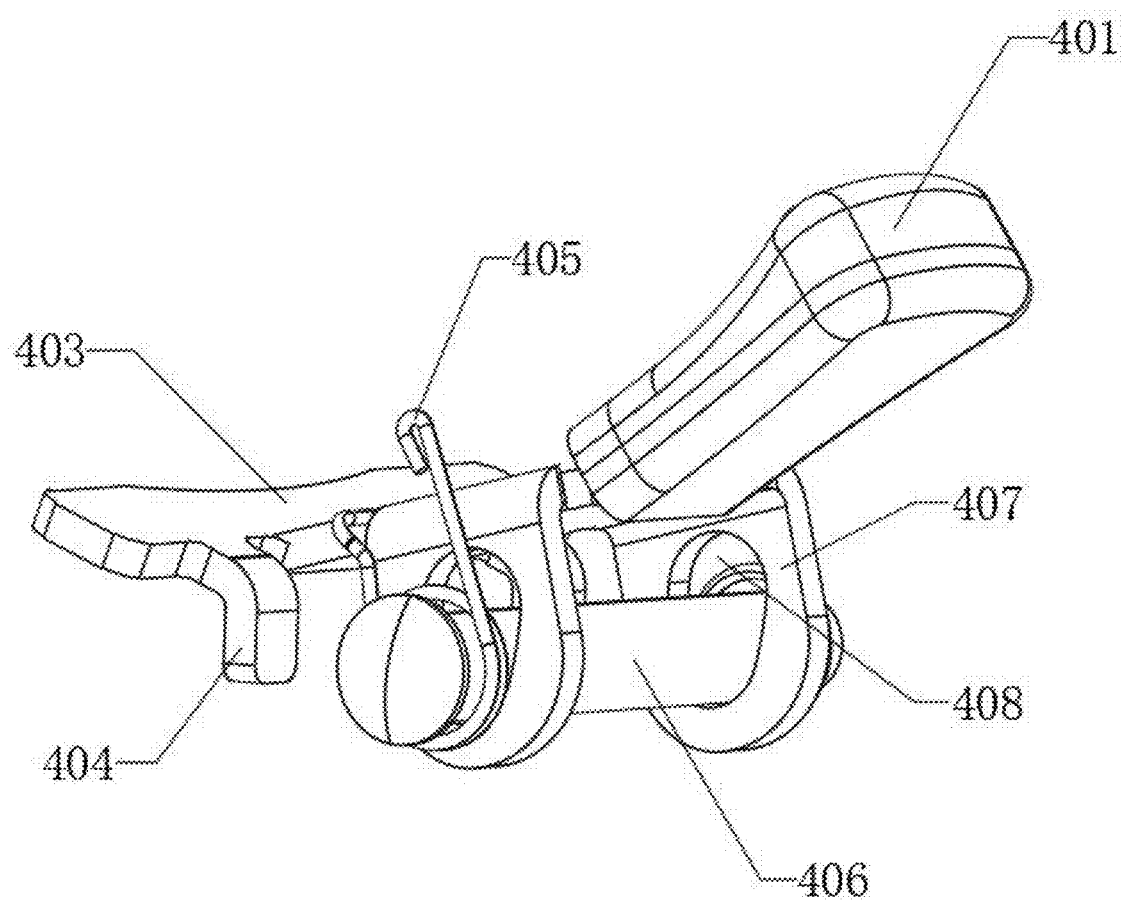
FIG. 12 is a structural schematic view from another perspective of FIG. 11.
Figure 13:
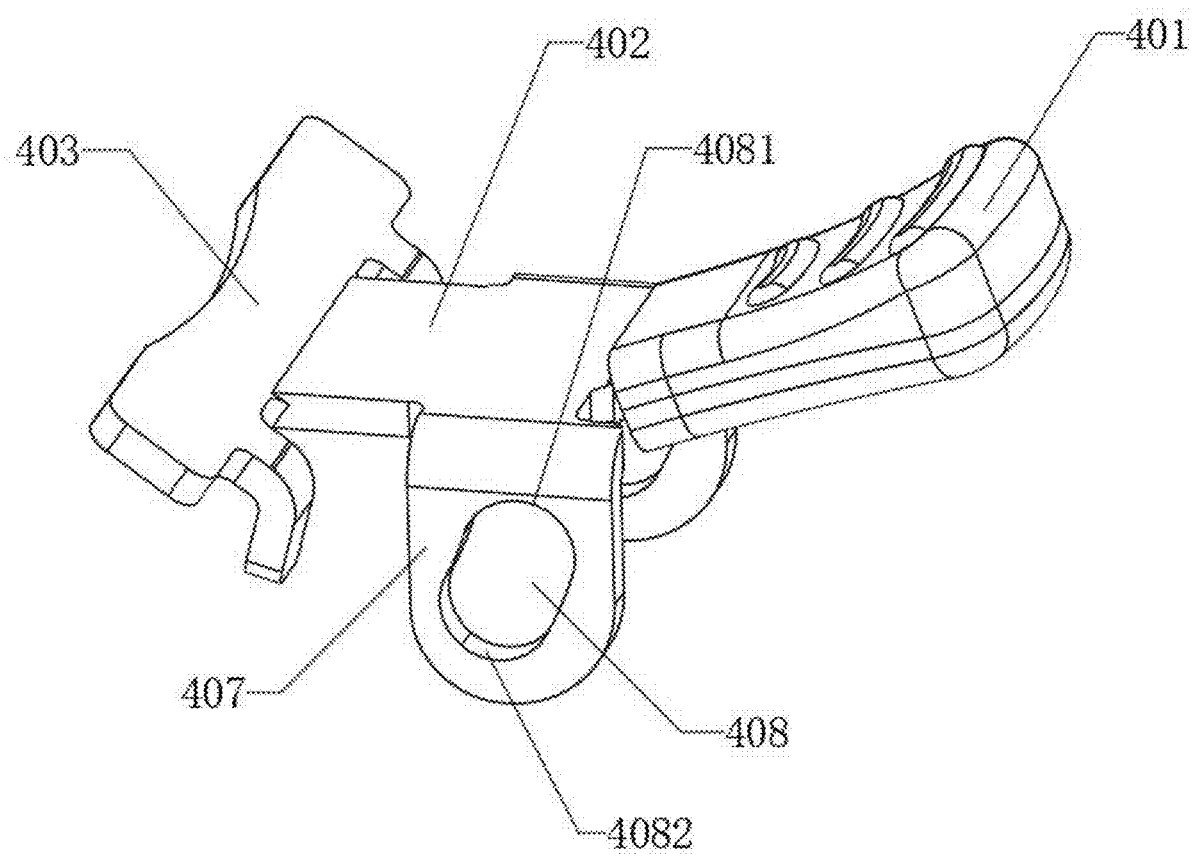
FIG. 13 is a structural schematic view of FIG. 11 with the pin shaft removed.
Figure 14:
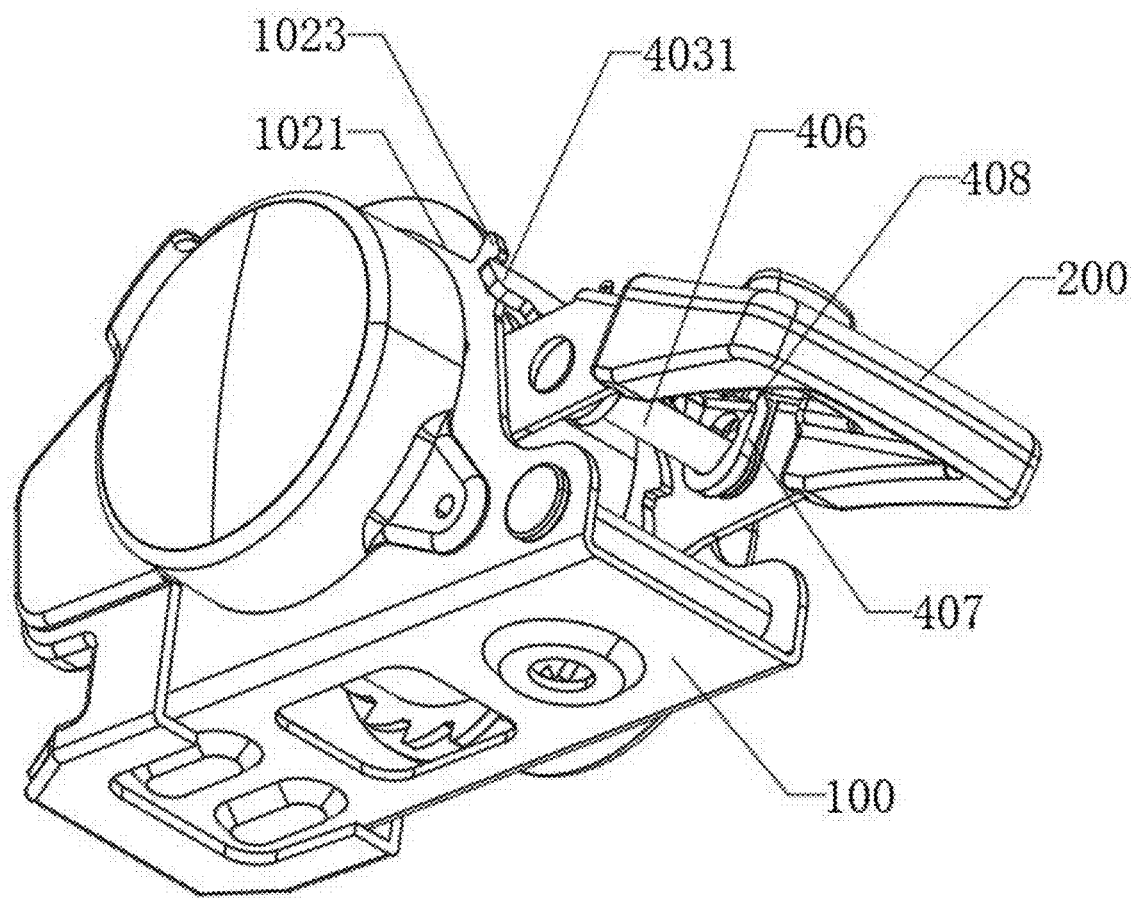
FIG. 14 is a structural schematic view of the embodiment of FIG. 11 after being installed on a base.
Figure 15:
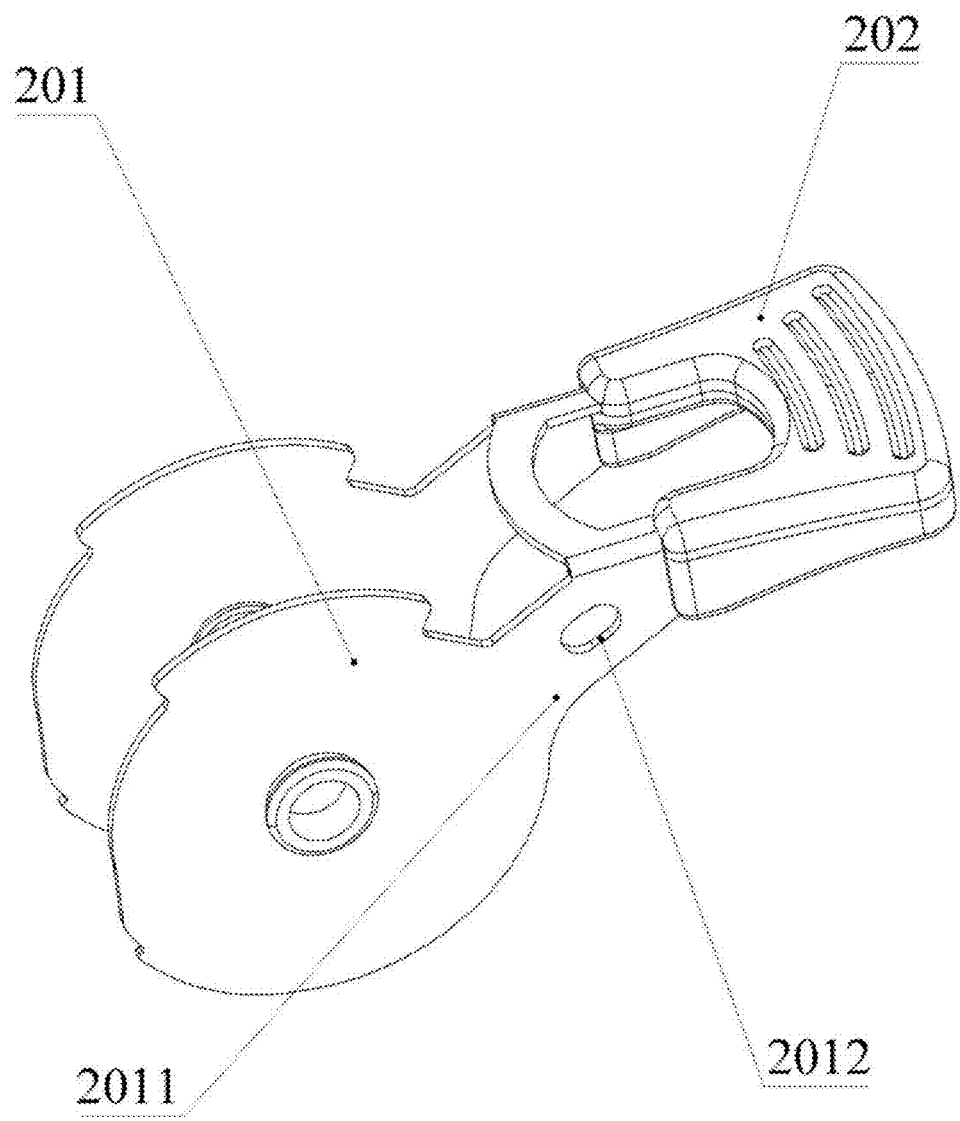
FIG. 15 is a structural schematic view of the operating mechanism in FIG. 1.

In other possible embodiments of the elastic check claw 404, as shown in FIG. 11 to FIG. 13, the elastic check claw 404 can also be in the shape of a straight sheet. With the elastic check claw 404 in the shape of a straight sheet, when the ratchet wheel 303 rotates clockwise, the gear teeth 3031 can slide over the elastic check claw 404 more smoothly. However, the straight-sheet elastic check claw 404 is more suitable for scenes with less load because its check force is smaller.

In other possible embodiments of the elastic check claw 404 (not shown), the elastic check claw 404 can also be in the shape of the outer contour of the gear teeth 3031, in which case, the elastic check claw 404 is relatively parallel to the gear teeth 3031. Specifically, a straight sheet part parallel to the straight part of the gear tooth 3031 is separated from the gear tooth 3031 by a small distance, while the concave arc part parallel to the curved part of the gear teeth 3031 is separated from the gear teeth 3031 by a smaller distance. When the ratchet wheel 303 rotates counterclockwise, the elastic check claw 404 is elastically deformed, and since the contours thereof are almost the same, the contact area between the elastic check claw 404 and the gear teeth 3031 is larger, so that the elastic check claw 404 can bear greater rotary torque. Because the elastic check claw 404 is more difficult to deform, the check effect of the ratchet wheel 303 is more obvious when the winding and unwinding mechanism 300 is not pulled by an external force. When the external force pulls the webbing 500, the ratchet wheel 303 has a tendency to rotate clockwise, so that the elastic check claw 404 can be easily isolated from the gear teeth 3031, which causes the rotary torque of the elastic check claw 404 to be easily destroyed, thereby the gear teeth 3031 can smoothly pass through the elastic check claw 404, allowing the winding and unwinding mechanism 300 to rotate clockwise.

Referring to FIGS. 11 to 15, the present disclosure further provides an anti-jamming ratchet-type tensioning device, which includes a base 100 which is provided with a winding and unwinding and unwinding mechanism 300. The winding and unwinding and unwinding mechanism 300 includes a ratchet wheel 303 with gear teeth 3031, and the base 100 is further provided with an operating mechanism 200, through which the winding and unwinding and unwinding mechanism 300 can be selectively locked or unlocked. A lever element 400 is rotatably connected to the operating mechanism 200. The lever element 400 has two opposite ends, which are respectively configured as a pressing end 401 and an executing end 402. The executing end 402 is provided with an elastic check claw 404 located within the rotation radius of the ratchet wheel 303 for preventing the ratchet wheel 303 from rotating back.

In this embodiment, the operating mechanism 200 is provided with a support element, the lever element 400 is provided with a movement area, and the support element extends into the movement area. The accommodating area of the movement area is larger than that of the support element, and the support element is allowed to move in the movement area. The pressing end 401 and the executing end 402 form a lever by taking the support element as a fulcrum. When the pressing end 401 is pressed, the executing end 402 tilts, and the elastic check claw 404 is located outside the rotation radius of the ratchet wheel 303.

The support element can support the lever element 400, so that when the pressing end 401 is pressed, the lever element 400 can rotate with the support element as a fulcrum, thereby tilting the executing end 402 and further tilting the elastic check claw 404.

By providing the support element in the movement area and configuring it to be movable, relative movement can be generated between the support element and the lever element 400. Therefore, if the ratchet wheel 303 rotates clockwise when the elastic check claw 404 abuts against the ratchet wheel 303 for checking, the rotating gear teeth 3031 can push the elastic check claw 404 away. In this way, the friction and resistance between the elastic check claw 404 and the gear teeth 3031 can be reduced, so that the gear teeth 3031 can slide over the elastic check claw 404 more smoothly, and the situation of jamming can be avoided. Therefore, it is smoother and more labor-saving to pull out the webbing 500 from the winding and unwinding mechanism 300.

In an embodiment, the support element is a pin shaft 406 inserted into the extended end 2011 and located between the winding and unwinding mechanism 300 and the handle 202. The lever element 400 is provided with a rotating part 407, which is located between the pressing end 401 and the executing end 402. The movement area is disposed on the rotating part 407. The movement area is a slotted hole 408, which has a topmost end 4081 and a bottommost end 4082. The pin shaft 406 is movable between the topmost end 4081 and the bottommost end 4082. When the pin shaft 406 approaches the bottommost end 4082, the elastic check claw 404 moves away from the gear teeth 3031. A torsion spring 405 is also sleeved outside the pin shaft 406, and the torsion spring 405 extends in the direction that the executing end 402 tilts upward.

In the above embodiment, the pin shaft 406 can move back and forth between the topmost end 4081 and the bottommost end 4082. The elastic check claw 404 is a straight-sheet shaped and integrally formed with the locking element 403. The lever element 400 can rotate outside the pin shaft 406, so as to press the pressing end 401, and the executing end 402 can be tilted together with the locking element 403 and the elastic check claw 404. By providing the torsion spring 405, when the external force pressed on the pressing end 401 is removed, the torsion spring 405 can use the elastic force to push the lever element 400 to rotate and reset.

In the above embodiment, when the elastic check claw 404 abuts against the ratchet wheel 303 for check, if the ratchet wheel 303 rotates clockwise, since the pin shaft 406 can move back and forth between the topmost end 4081 and the bottommost end 4082, the rotating gear teeth 3031 can push the elastic check claw 404 away, the lever element 400 will move up due to the thrust, and the pin shaft 406 will move toward the bottommost end 4082 of the slotted hole 408. When the gear teeth 3031 slide over the elastic check claw 404, the torsion spring 405 pushes the lever element 400 to move down and reset by the resilience, and the pin shaft 406 returns to the topmost end 4081 again. Therefore, in this way, when the ratchet wheel 303 continues to rotate clockwise, the lever element 400 will reciprocate up and down with the rotation of the ratchet wheel 303, so that the friction and resistance between the elastic check claw 404 and the gear teeth 3031 can be reduced, and the gear tooth 3031 can slide over the elastic check claw 404 more smoothly, avoiding the situation of jamming. Therefore, it is smoother and more labor-saving to pull out the webbing 500 from the winding and unwinding mechanism 300.

In the above embodiment, an oval-shaped through-hole 2012 is disposed on the extended end 2011, with the pin shaft 406 inserted therein.

In the above embodiment, when the pin shaft 406 is inserted into the through hole 2012, there is a certain gap between the left and right inner walls of the through hole 2012 and the pin shaft 406, allowing the pin shaft 406 to move left and right within the hole to a limited extent. When the ratchet wheel 303 rotates clockwise, the ratchet wheel 303 impacts and contacts the elastic check claw 404. This impact force is transmitted and acts on the pin shaft 406, driving the pin shaft 406 to slide backward along the through hole 2012, causing the elastic check claw 404 to move accordingly. This action allows the elastic check claw 404 to momentarily avoid the ratchet wheel 303, achieving smooth rotation without jamming, significantly improving operational smoothness and effort-saving effects.

In the above embodiment, this gap ranges between 0.5 millimeters and 2 millimeters.

In the above embodiment (not shown), the through hole 2012 is omitted, and a specially shaped guide groove (e.g., a straight groove, a slightly curved groove, or a groove with a limiting protrusion) is machined on the extended end 2011. The pin shaft 406 still passes through this guide groove along the length direction of the guide groove (which is typically designed to align with the direction of impact force transmission or the required avoidance path). When the ratchet wheel 303 rotates clockwise and generates an impact force, this force drives the pin shaft 406 to slide backward along the predetermined path of the guide groove; the guide groove can guide the sliding direction of the pin shaft 406 more precisely, thereby avoiding minor deviations or rotations that may occur in an elliptical hole, and ensuring more stable and predictable avoidance of the pawl.

In the above embodiment (not shown), an elastic buffer pad (such as a rubber pad, polyurethane pad, or silicone pad) is installed on the inner wall of the through hole 2012 away from the ratchet wheel 303, positioned precisely at the position where the pin shaft 406 slides into place. During impact, the pin shaft 406 acceleratively slides within the gap until it collides with the rear elastic buffer pad. The buffer pad compresses and deforms, absorbing most of the kinetic energy from the pin shaft 406 (and the transmitted impact), preventing direct hard collision between the pin shaft 406 and the metal limiting surface, thereby reducing part damage, deformation, and wear of components and extending service life.

In other embodiments of the support element (not shown), the support element can also be a cylindrical boss that is inserted into the slotted hole 408 and can move in the slotted hole 408. The lever element 400 can rotate along the boss. Of course, the support element is not limited to the form of the pin shaft 406 or the boss, but may also be a pin, a slide key and other forms which are suitable for supporting the lever element 400 to rotate and move.

Of course, the movement area is not limited to the form of a through groove. In other embodiments of the movement area (not shown), the movement area can also be correspondingly provided with grooves according to the forms of different support elements, and the shape is correspondingly configured according to the outer contour of the support element.

For example, when the support element is a cylindrical boss, the movement area can be set in the shape of a strip groove, and the boss can rotate and move in the strip groove. When the support element is a slide key, the movement area may be set as a keyway correspondingly. When the support element is a slide key, the slide can be rotatably connected with the operating mechanism 200, thus ensuring that the lever element 400 can rotate with the slide key.

To sum up, the present disclosure achieves the following technical effects:

By disposing both the elastic check claw 404 and the locking element 403 at the executing end 402 of the lever element 400, the elastic check claw 404 and the locking element 403 can be operated at the same time by pressing the lever element 400 to realize the functions of locking, unlocking or checking, so that the structure of the tensioner is simpler and more compact, the operation is simple and convenient, and the processing and manufacturing cost is effectively reduced.

By providing the movement area on the lever element 400, when the elastic check claw 404 abuts against the ratchet wheel 303 for check, and the ratchet wheel 303 rotates clockwise, the lever element 400 will reciprocate up and down with the rotation of the ratchet wheel 303, thereby reducing the friction and resistance between the elastic check claw 404 and the gear teeth 3031, so that the gear teeth 3031 can smoothly slide over the elastic check claw 404, and avoiding the situation of being stuck. Therefore, it is smoother and more labor-saving to pull out the webbing 500 from the winding and unwinding mechanism 300.

By providing an oval-shaped through hole 2012 on the support member of the supporting lever element 400, the pin shaft 406 in the lever element can undergo limited displacement within the hole. When the ratchet wheel 303 rotates clockwise and impacts the elastic check claw 404, the impact force is transmitted through the elastic check claw 404 to the pin shaft 406. At this point, the radial clearance provided by the through hole 2012 allows the pin shaft 406 to slide along the long axis of the hole, such as toward the side away from the ratchet wheel, driving the elastic check claw to move synchronously, achieving instantaneous avoidance of the ratchet wheel. This design converts impact forces into controllable sliding displacement, completely eliminating the jamming phenomenon of traditional rigid check structures, significantly improving operational smoothness while reducing rotational resistance, achieving an effort-saving effect.

What has been described above is only the preferred embodiment of the present disclosure, and it is not intended to limit the present disclosure. For those skilled in the art, the present disclosure may have various modifications and changes. Any modification, equivalent substitution, improvement, etc. made within the spirit and principle of the present disclosure shall be included in the protection scope of the present disclosure.

What is claimed is:

1. An anti-jamming ratchet-type tensioning device, comprising:
    a base; and
    a winding and unwinding mechanism disposed on the base, wherein
    the winding and unwinding mechanism comprises:
    a ratchet wheel equipped with gear teeth; and
    an operating mechanism disposed on the base, with a moving area formed on the operating mechanism; and
    a lever element pivotally connected to the operating mechanism, wherein
    the lever element comprises:
    a pressing end; and
    an executing end; and
    an elastic check claw disposed on the executing end, wherein the elastic check claw is located within a rotation radius of the ratchet wheel and configured to prevent reverse rotation of the ratchet wheel; and
    a support member passing through the moving area, wherein a gap exists between an inner wall of the moving area and the support member, allowing limited movement of the support member within the moving area, and meanwhile the pressing end and the executing end pivot on the support member to form a lever, such that pressing the pressing end causes the executing end to lift, and the elastic check claw is positioned outside the rotation radius of the ratchet wheel; and
    wherein when the ratchet wheel rotates clockwise and impacts the elastic check claw, an impact force is transmitted through the elastic check claw and the lever element to the support member, driving the support member to move within the moving area and causing the elastic check claw to produce an instantaneous avoidance displacement relative to the ratchet wheel, such that the gear teeth maintain a non-rigid contact as sliding past the elastic check claw, thereby reducing frictional resistance and avoiding jamming.

2. The anti-jamming ratchet-type tensioning device according to claim 1, wherein the gap is 0.5 mm to 2 mm.

3. The anti-jamming ratchet-type tensioning device according to claim 1, wherein the operating mechanism comprises a connecting part and a handle, and the connecting part is rotationally connected to the winding and unwinding mechanism.

4. The anti-jamming ratchet-type tensioning device according to claim 3, wherein the connecting part has an extended end away from the winding and unwinding mechanism, and the handle is installed at a tip of the extended end.

5. The anti-jamming ratchet-type tensioning device according to claim 4, wherein the moving area is a through-hole that is provided on the extended end and located between the winding and unwinding mechanism and the handle.

6. The anti-jamming ratchet-type tensioning device according to claim 5, wherein a cross-section of the through-hole is oval-shaped.

7. The anti-jamming ratchet-type tensioning device according to claim 5, wherein the support member is a pin shaft inserted through the through-hole.

8. The anti-jamming ratchet-type tensioning device according to claim 7, wherein a torsion spring is sleeved outside the pin shaft, and the torsion spring extends in a direction where the executing end tilts upward.

9. The anti-jamming ratchet-type tensioning device according to claim 1, wherein the moving area is a guide groove, and the guide groove is a straight groove, an arc-shaped groove, or a groove with a limiting protrusion; and wherein a length direction of the guide groove is parallel to an impact force transmission direction.

10. The anti-jamming ratchet-type tensioning device according to claim 1, wherein an elastic buffer pad is provided on the inner wall of the moving area away from the ratchet wheel; and wherein when the support member moves to a limit position under an impact force, the support member contacts the elastic buffer pad.

11. The anti-jamming ratchet-type tensioning device according to claim 10, wherein the elastic buffer pad is made of rubber, polyurethane, or silicone.

12. The anti-jamming ratchet-type tensioning device according to claim 1, wherein the executing end is further provided with a locking member, and the elastic check claw is arranged on the locking member and extends toward the ratchet wheel.

13. The anti-jamming ratchet-type tensioning device according to claim 12, wherein the elastic check claw is straight sheet shaped.

14. The anti-jamming ratchet-type tensioning device according to claim 13, wherein the base further has a side wall, and an outer contour of the side wall is provided with a locked position and a released position; and wherein the locking member is selectively placed at the locked position or the released position.

15. The anti-jamming ratchet-type tensioning device according to claim 14, wherein when the locking element is in the locked position, the locking element is located within the rotation radius of the ratchet wheel and engaged with the gear teeth; and wherein when the locking element is in the released position, the locking element is located outside the rotation radius of the ratchet wheel.

* * * * *